United States Patent [19]
Takayama

[11] Patent Number: 4,996,762
[45] Date of Patent: Mar. 5, 1991

[54] COMPOSITE PROCESSING MACHINE
[75] Inventor: Kazutoshi Takayama, Nagano, Japan
[73] Assignee: Nissei Plastics Industrial Co., Ltd., Japan
[21] Appl. No.: 381,739
[22] PCT Filed: Oct. 28, 1988
[86] PCT No.: PCT/JP88/01106
  § 371 Date: Jun. 23, 1989
  § 102(e) Date: Jun. 23, 1989
[87] PCT Pub. No.: WO89/03745
  PCT Pub. Date: May 5, 1989
[30] Foreign Application Priority Data
  Oct. 28, 1987 [JP] Japan ................ 62-272804
[51] Int. Cl.⁵ .......................... B23Q 3/155
[52] U.S. Cl. .................... 29/568; 219/69.11
[58] Field of Search ............ 29/568, 26 A, 33 T; 219/69.11, 69.1, 69.12, 69.13; 408/35; 409/232

[56]      References Cited
    U.S. PATENT DOCUMENTS

| 4,316,071 | 2/1982 | Bonga | 219/69.11 |
| 4,367,389 | 1/1983 | Inoue | 219/69.11 X |
| 4,563,800 | 1/1986 | Bonga | 29/568 |
| 4,596,066 | 6/1986 | Inoue | 29/568 |
| 4,641,007 | 2/1987 | Lach | 219/69.11 |
| 4,703,142 | 10/1987 | Dzewaltowski et al. | 219/69.1 X |
| 4,739,145 | 4/1988 | Check | 219/69.1 X |
| 4,764,653 | 8/1988 | Bühler | 219/69.1 X |

FOREIGN PATENT DOCUMENTS

| 24379 | 2/1979 | Japan | 29/568 |
| 172636 | 11/1985 | Japan | 29/568 |

Primary Examiner—William Briggs
Attorney, Agent, or Firm—Ostrolenk, Faber, Gerb & Soffen

[57]      ABSTRACT

This invention relates to a composite processing machine designed so as to be movable in a longitudinal and lateral direction on the side of a work table so that cutting process, discharge process, electrolytic grinding process and the like may be accomplished by a single machine, comprising means for moving a work table (1) on a machine bed (2) in a direction of x-axis and y-axis, a processing unit (9) having a chuck (14) capable of being detachably engaged with various tools and a discharge electrode at the fore end of a spindle (1) positioned upwardly of the work table (1) and comprising a motor (15) for rotating spindle and a fixing brake (12), means for moving a processing unit (9) in a direction of z-axis, an auto tool changer (18) for holding a cutting tool, a discharge electrode, a measuring probe, a grinding wheel and the like to selectively feed them to the chuck, and a processing power source (22) connected over a discharge electrode (26) or a grinding wheel (51) mounted on the chuck (14) and a work (4) within the liquid tank or a nozzle (50) for coolent to apply a dc current to a processing power source (22).

13 Claims, 6 Drawing Sheets

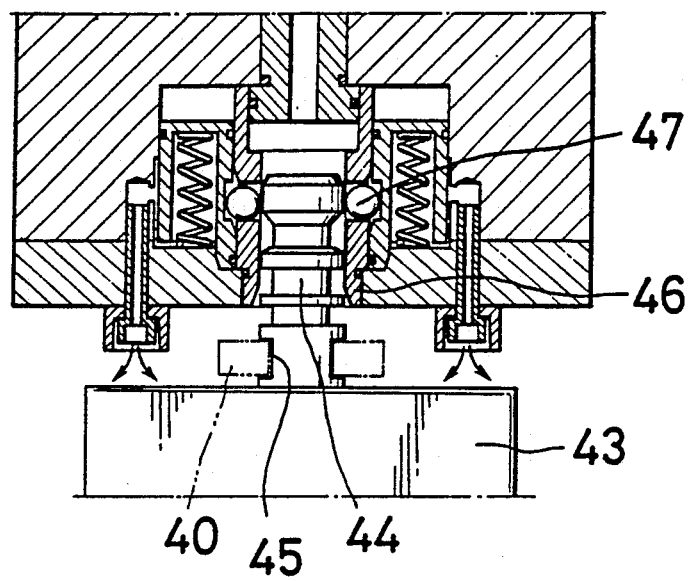
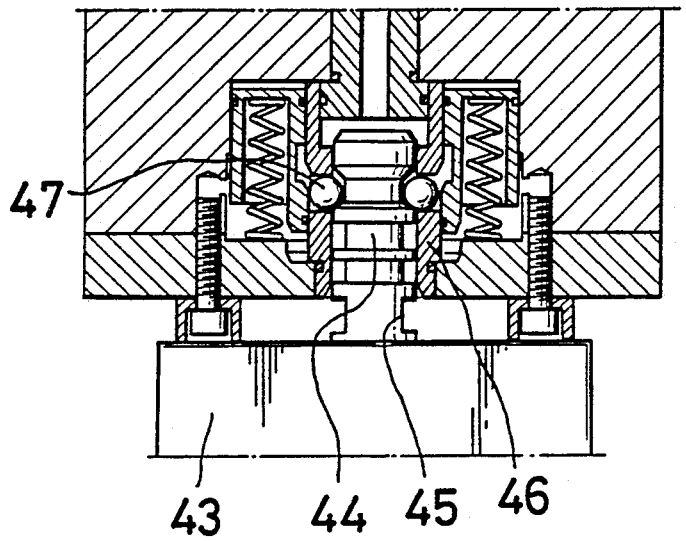
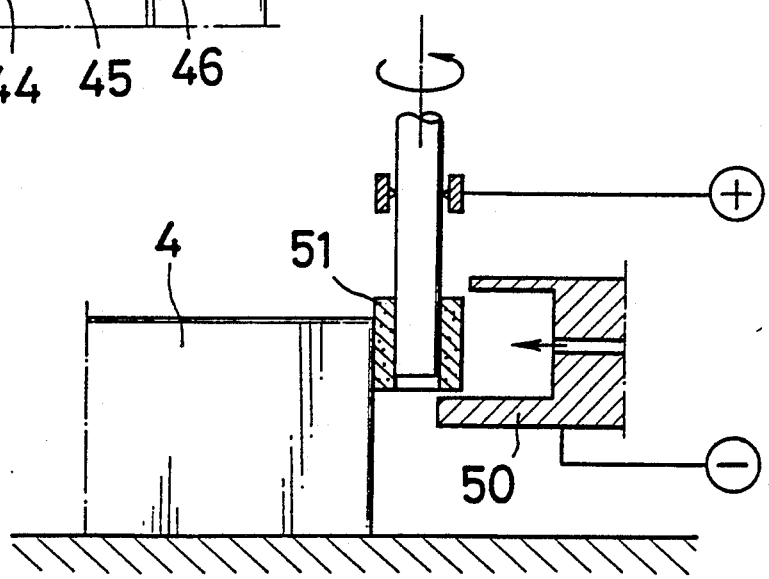

COMPOSITE PROCESSING MACHINE

FIELD OF THE ART

This invention relates to a composite processing machine having processing functions such as a cutting process, a discharge process, a grinding process and the like which is suitable for use with fabrication of principally molding molds.

BACKGROUND

Generally, cavity processing of a molding mold used for injection molding, compression molding and transfer molding of synthetic resins, and die casting molding of metal and the like is accomplished principally by combination of cutting process using milling and process using discharge. Two machine tools, a milling machine and a discharge processing machine, are used for the aforesaid process.

Because of the foregoing, there arises problems that a wide installation space for the machine tools in the factory is required, equipment cost increases, time required for movement of work between the processing machines and locating thereof and required for arrangements attended by preparation work programs increases, and the processing precision is deteriorated.

DISCLOSURE OF THE INVENTION

This invention has been achieved in order to solve the above-described problems. It is an object of this invention to provide a new composite processing machine, which even a single machine, has many processing functions such as cutting process in the form of milling, drilling process in the form of a drill, discharge process and the like, while paying attention to a common point in construction between a milling machine and a discharge processing machine.

It is a further object of this invention to provide a new composite processing machine which can also carry out grinding process of molds according to an electrolytic inprocess dressing grinding process utilizing discharge process means.

In this invention for achieving the aforementioned objects, there comprises a work table having on the upper surface thereof a liquid tank for accomodating and securing a work, means for moving the work table in a direction of X and Y axes, a processing unit wherein a chuck capable of detachably mounting various tools and a discharge electrode is provided on the fore end of a spindle positioned upwardly of the work table and which is provided with a motor for rotating the spindle and a fixing brake, means for moving the processing unit in a direction of z-axis, an auto tool changer (ATC) which holds a cutting tool, a discharge electrode, a measuring probe, a grinding wheel and the like to selectively feed them to the chuck, and a processing power source connected over the discharge electrode mounted on the chuck or the grinding wheel and the work within the liquid tank or a nozzle for a coolant to apply a dc current thereto.

In the composite processing machine according to this invention, the liquid tank on the work table is filled a processing liquid for discharge, after which a work is set within the liquid tank, and the processing unit is moved down with respect to the work. If a tool mounted on the chuck at the fore end of the spindle is one used for cutting or drilling, cutting or drilling of the work is carried out by rotation of the spindle. If a tool is a discharge electrode, the chuck side thereof is set to pole (+) while the work side thereof is set to pole (−), and a dc current is applied from the processing power source to effect discharge processing.

In case of effecting the grinding process by the electrolytic in-process dressing grinding process, the processing liquid is removed from the liquid tank, and the grinding wheel side thereof is set to pole (+) while the coolant nozzle side provided within the liquid tank is set pole (−) for dressing, and a dc current is applied from the processing power source.

The tools used for the above-described processes or measurement are supplied from ATC to the chuck according to the work steps, and a new tool is exchanged with the tool mounted on the chuck by ATC.

The composite processing machine according to the present invention has both the milling processing function and discharge processing function as well as the electrolytic grinding processing function, and therefore, several processing works can be achieved by a single unit of machine, and less work space will suffice as compared with the case which requires plural units of machines having different processing functions, and supplementary equipment is reduced to thereby reduce equipment cost and enable activation of of the space within the factory.

Furthermore, the work can be subjected to several processings without being moved, and therefore, no processing error occurs, and failure in processing due to an erroneous operation can be minimized. In addition, both the milling processing and discharge processing can be continuously accomplished in the unmanned mode to realize a rationalization of work and labor-saving.

Moreover, since cutting processing is effected within the processing liquid, no scattering of chips occurs. Thus, thermal stability of the work, cutting tool and the like enhances, and deterioration of cutting tools and change in texture of work caused by overheat can be prevented.

In addition, a measuring device such as a three-dimensional measuring probe together with a cutting tool is disposed on ATC and is supplied to the chuck so that a processing dimension can be immediately measured or recorded. Therefore, no labor for measurement is required, and the processing precision is further enhanced. Since most of mold processing works may be carried out by a single unit of machine, time for arrangements is short, and work efficiency is improved, as a consequence of which the delivery period of products can be shortened and the manufacture cost is also lowered. As just mentioned, this invention has various advantages.

BRIEF DESCRIPTION OF THE DRAWINGS

The drawings show embodiments of a composite processing machine according to this invention.

FIGS. 8 and 9 are respectively longitudinal sectional views of a chuck portion explaining in order the state in which tool is mounted.

FIG. 10 is a fragmentary sectional view showing the grinding processing state.

BEST MODE FOR CARRYING OUT THE INVENTION

Figure 1:
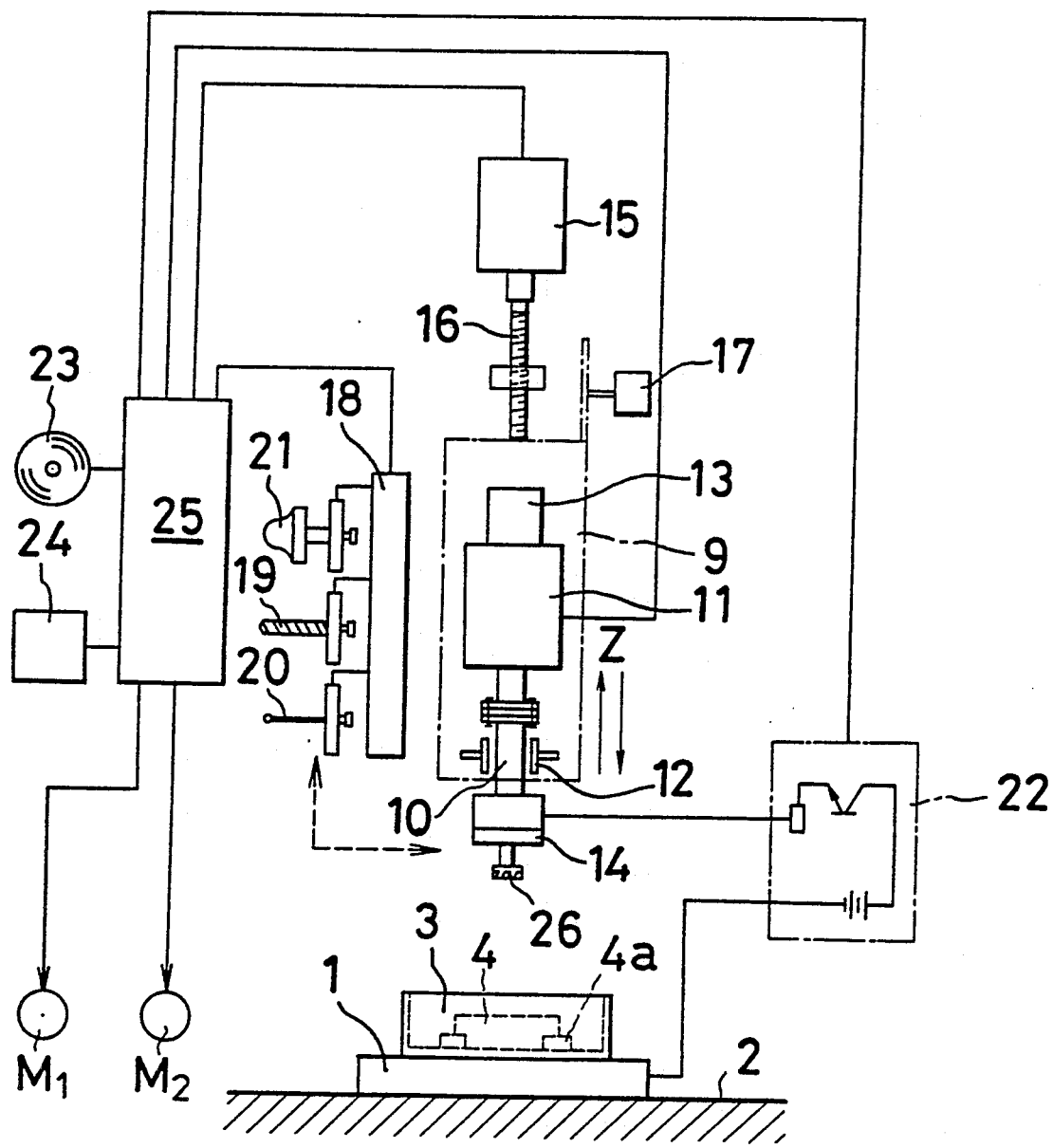
FIG. 1 is an explanatory view schematically showing a composite processing machine.

In the Figure, reference numeral 1 designates a work table movably provided on a machine bed 2, and on the upper surface of the work table is provided a liquid tank 3 filled with a processing liquid (mineral oil principally comprising paraffin type hydrocarbon). Within the liquid tank are a block-like work 4 and its fixing member 4a. Although not shown, the work table 1 may be slidably moved in a direction of X-axis (forward and backward) and axis-Y (left and right) by means of a cross roller guide.

Figure 2:
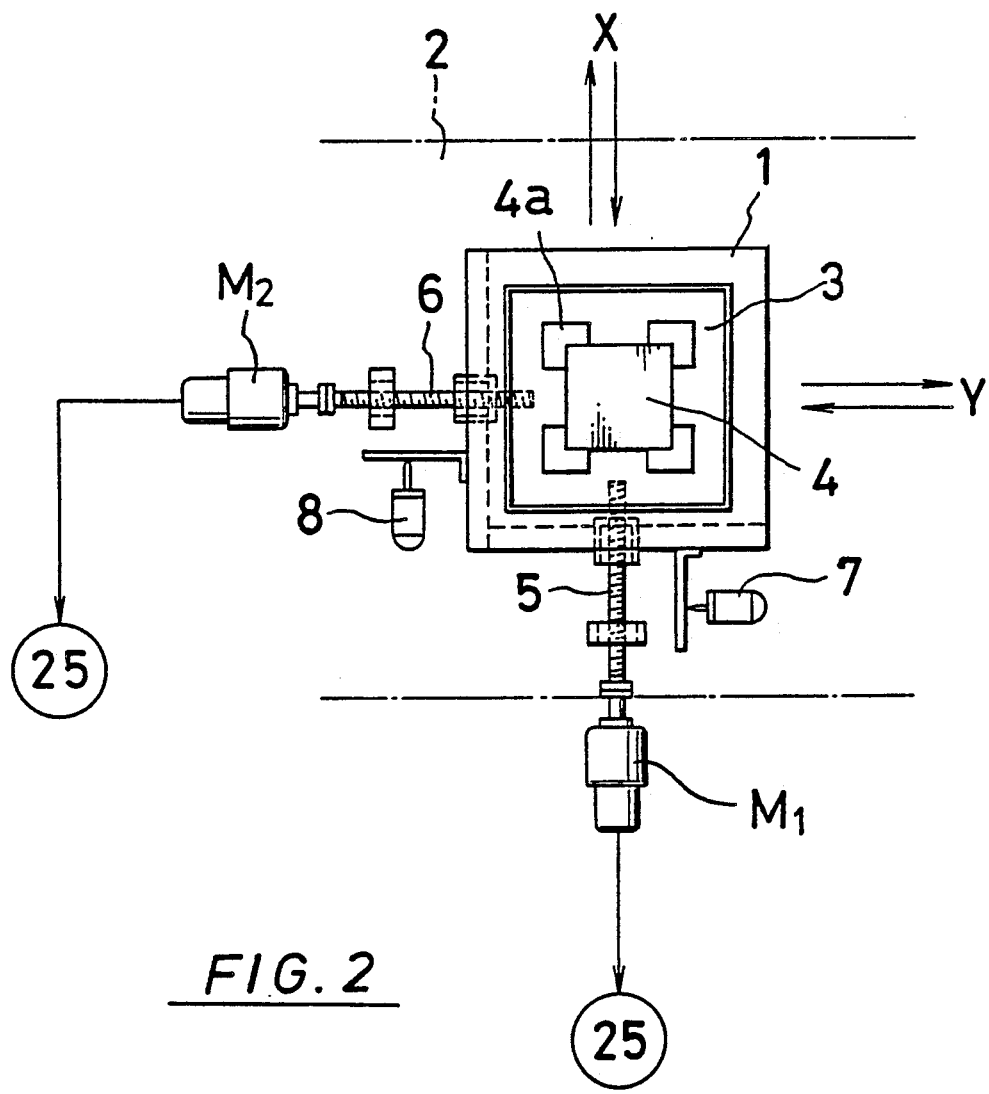
FIG. 2 is a schematic plan view for explaining the movement of a work table.

As shown in FIG. 2 as one example, means for moving the work table 1 is composed of electric type servo motors M1 and M2, rotatable ball threaded shafts 5 and 6, and members supplemental thereto. The work table 1 is slidably moved on the machine bed in a direction of x-axis or y-axis by the thread lead of the ball threaded shafts 5 and 6 which are rotated by the servo motors. The amount of movement of the work table 1 in each direction is electrically detected by position detectors 7 and 8.

Numeral 9 designates a processing unit, which is provided upwardly of the work table along with the moving means in a direction of Z-axis (vertical), as shown in FIG. 1. This processing unit 9 comprises a spindle 10 positioned vertically on the work table, a motor 11 for rotating the spindle 10, and a brake 12 for locking the spindle 10 when not in rotation, the motor 11 having a rotary encoder 13 provided thereon to detect a rotational angle. A chuck 14 capable of detachably mounting various tools and a discharge electrode is mounted on the fore end of the spindle 10, that is, on the portion facing to the upper surface of the work table 1.

The moving means for the processing unit 9 is composed of an electric type servo motor 15, a ball threaded shaft 16 rotated by the servomotor, a slide guide for vertically guiding the processing unit 9 with respect to the work table 1, members supplemental thereto, and a position detector 17 for electrically detecting the amount of movement in a direction of z-axis.

Reference numeral 18 designates an auto tool changer called ATC disposed sideward of the processing unit 9 and comprises a drill 19, a plurality of tools such as a three-dimensional measuring probe 20, a discharge electrode 21, and a rotary magazine for accommodating a grinding wheel 51 later described.

Numeral 22 designates a processing power source, which comprises an independent type power source utilizing a switching characteristic of a transistor, the processing power source being electrically connected over an energizing part of the work table 1 and the chuck 12 so as to apply an dc current to the work 4 within the liquid tank 3.

The above-described servo motors M1, M2 and 15, the processing unit 9, the auto tool changer 18, and the processing power source 22 are connected to a central controller 25 to control various devices in accordance with information set in condition by a program tape 23 and a keyboard 24.

In the above-structured composite machine, the auto tool changer 18 is actuated by the central controller 25 to supply tools required for processings to the chuck 14 and exchange it with a milling 26 mounted on the chuck 14 for preparation of processing work. The servo motors M1, M2 and 15 are feedback-controlled by the detection data of the position detectors 7, 8 and 17 and the set data, whereby the work table 1 is moved in a direction of x-axis or y-axis to set the work 4 within the liquid tank 3 to a predetermined position, whereas the processing unit 9 is moved in a direction of z-axis, that is, vertically to move the cutting tool or the like mounted on the chuck toward and away from the work.

The cutting, drilling and discharge processings are all effected within the processing liquid poured into the liquid tank till the work 4 is immersed. Chips resulting from the processing are removed by the attraction of a magnet or vacuum, or means of a combination of injection of the processing liquid and vacuum.

The energization of the processing power source 22 occurs after the discharge electrode 21 has been mounted to the chuck 14 by the auto tool changer 18, and an dc current is applied to the work 4. The spindle 10 on which the discharge electrode 21 is mounted is locked so that the former may be rotated at low speed depending on the processing state or may not be rotated by operation of the brake 12, and thereafter the whole processing unit is moved down so that the cutting process is switched to the discharge process.

In the case of carrying out the grinding and polishing by way of the electrolytic in-process dressing cutting process making use of a power source for the discharge processing, the pole (−) of the processing power source is connected to the nozzle for coolant within the liquid tank set directed at the work after the processing liquid within the tank has been discharged. Since the magnet mounted on the chuck in place of the discharge electrode takes the pole (+) as it is, the electrolytic cutting occurs thereaft merely by energization while putting coolant to the grinding wheel.

Figure 3:
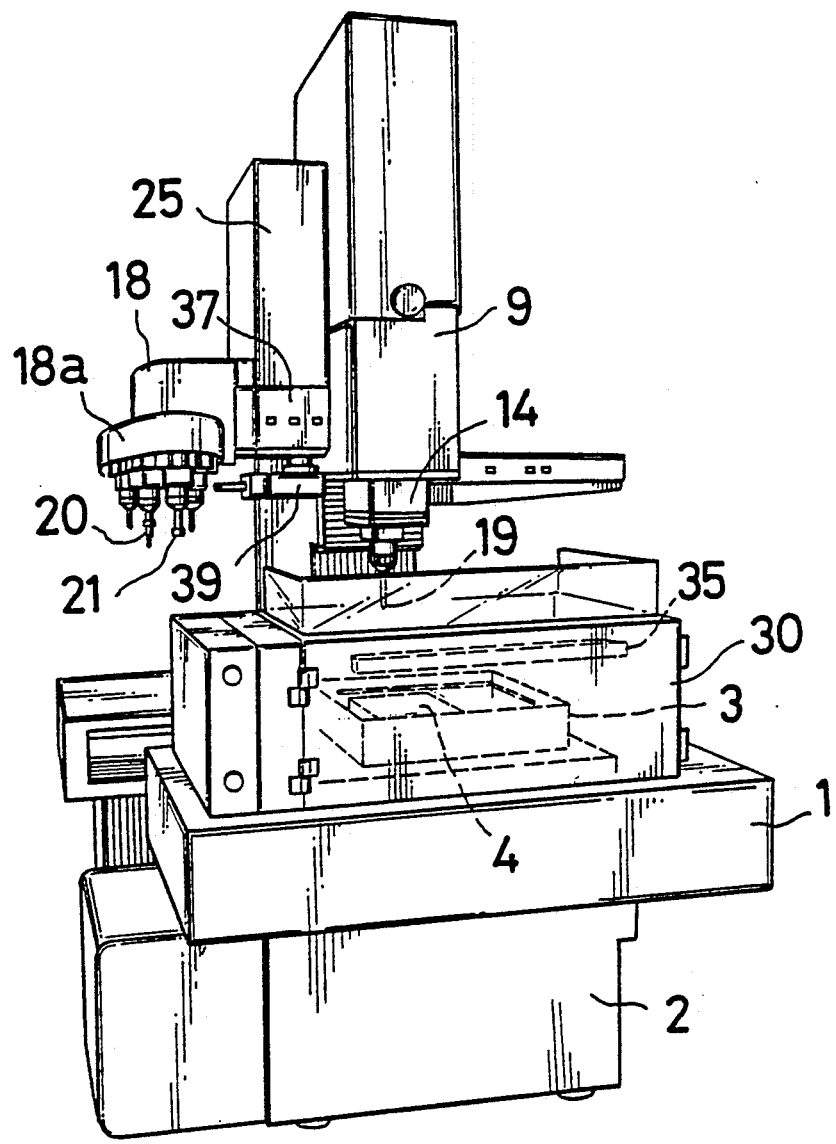
FIG. 3 is a perspective view showing a specific external construction of a composite processing machine.
Figure 5:
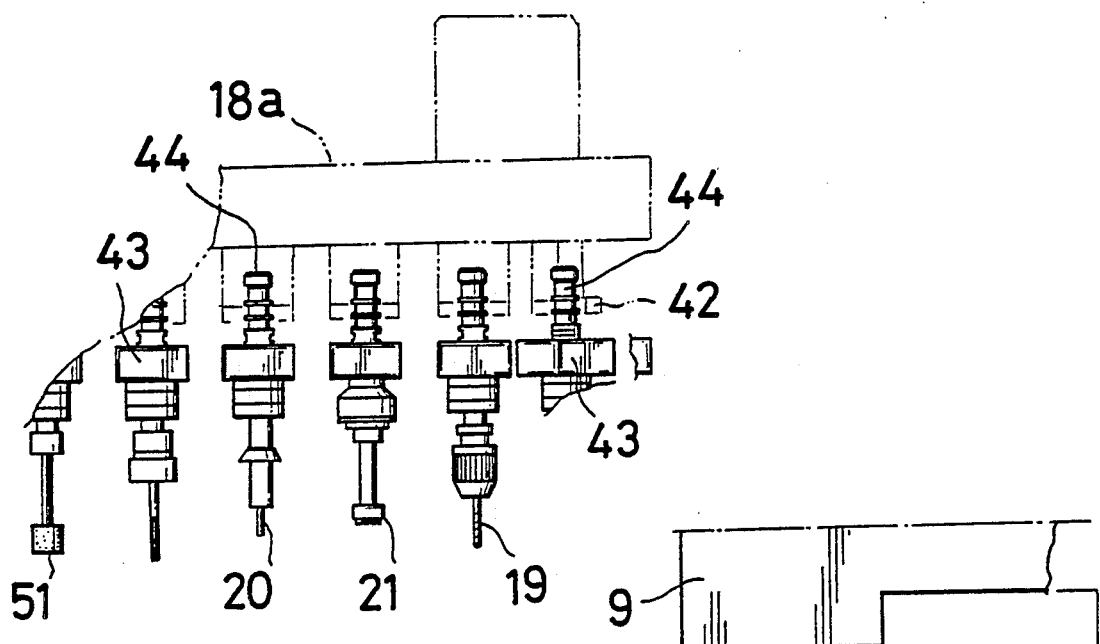
FIG. 5 is a side view of a part of tools accommodated in a rotary magazine.

FIG. 3 and thereafter show specifically structured embodiments, in which the same parts as those described above are indicated by the same reference numerals.

Figure 4:
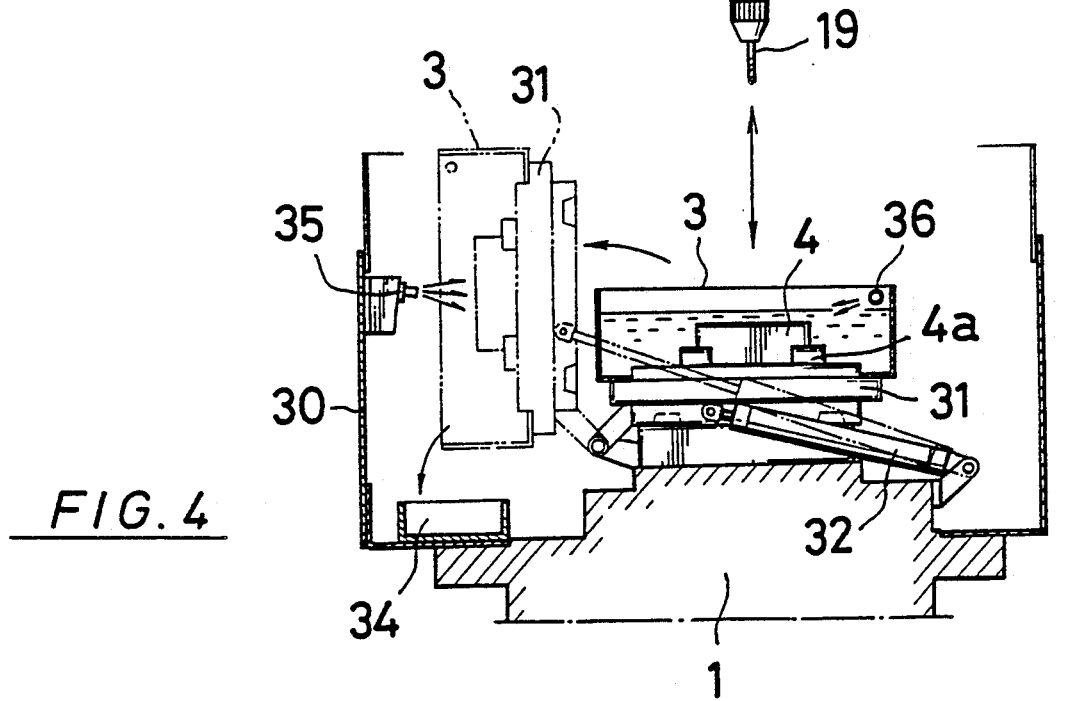
FIG. 4 is a side view of a part showing the work table side in its longitudinal section.

In FIGS. 3 and 4, the liquid tank 3 is positioned within an enclosure capable of being opened and closed water-tightly provided on the work table 1. The liquid tank 3 is also movably mounted on one side in the central portion of the work table 1 and placed horizontally in the central portion of the table. To a base 31 of the bottom of the liquid tank is connected a piston side of a hydraulically or pneumatically operated rise-and-fall device 32 whose cylinder side is supported on the work table.

When the rise-and-fall device 32 is extended, the liquid tank 3 is laterally pushed up along with the work 4 locked in the tank, a shown by the chain line in FIG. 4 to force out the processing liquid within the liquid tank to a discharge path 34 within the enclosure. A washing nozzle 35 is provided on the inner surface to which the work 4 faces. A nozzle 36 similar to the first-mentioned washing nozzle is provided also in the liquid tank, so that after the processing liquid has been discharged, the processing surface of the work 4 is washed by the jetting processing liquid to remove the chips or the like.

A tool positioned upwardly of the work table 1, for example, a drill 19 is mounted on the chuck 14 at the fore end of the spindle of the processing unit 9 supported movably up and down on the frame.

This drill 19 together with other tools are accomodated in a rotary magazine 18a disposed on the side of the processing unit 9, and is automatically transported to the chuck 14 as the necessity of drilling occurs. The transporting of the tools such as the drill 19 is effected by a transport device 37 provided between the processing unit 9 and the rotary magazine 18a.

The transport device 37, details of which are omitted, comprises a reciprocating device in the form of an air cylinder or a hydraulic cylinder provided with a piston rod, and a rotating and driving device for the piston rod, and a holding member 39 is provided at the fore end of a downwardly projected piston rod 38. A pair of pawl members 40 provided on one side of the holding member 39 so that the pawl members are moved forward and backward horizontally, the pawl members 40 removing as needed the tools individually hung on a holder 42 mounted on a circulation member 41 of the rotary magazine 18a or accommodating the tools removed from the chuck 14 into the holder as required.

Figure 6:
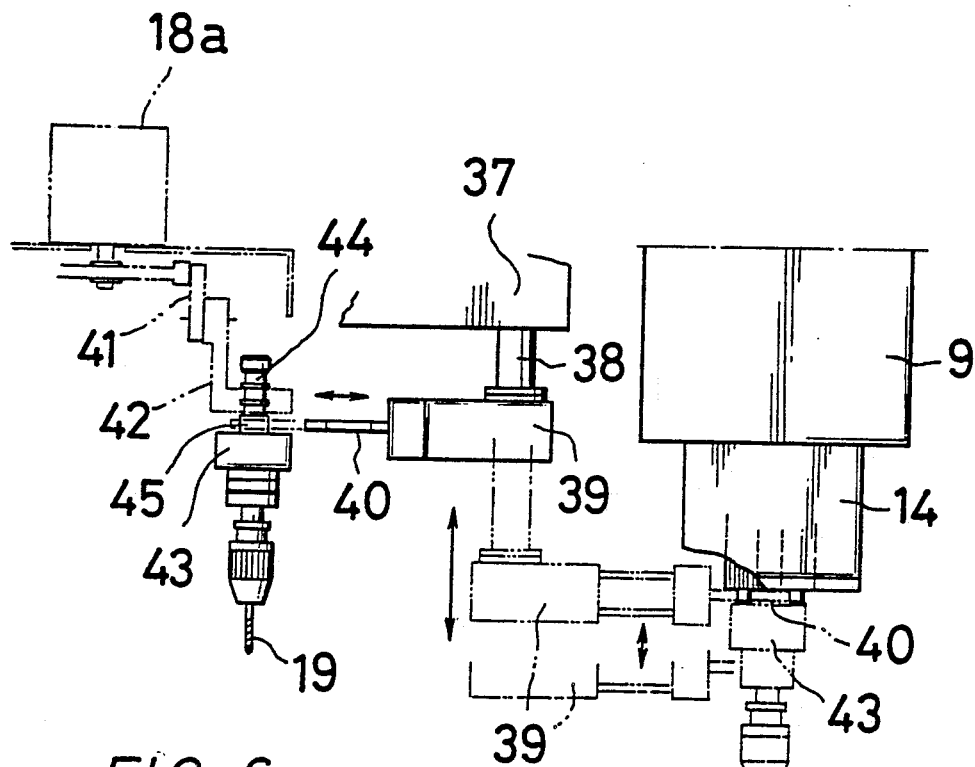
FIG. 6 is a front view showing a state of transporting a drill.
Figure 7:
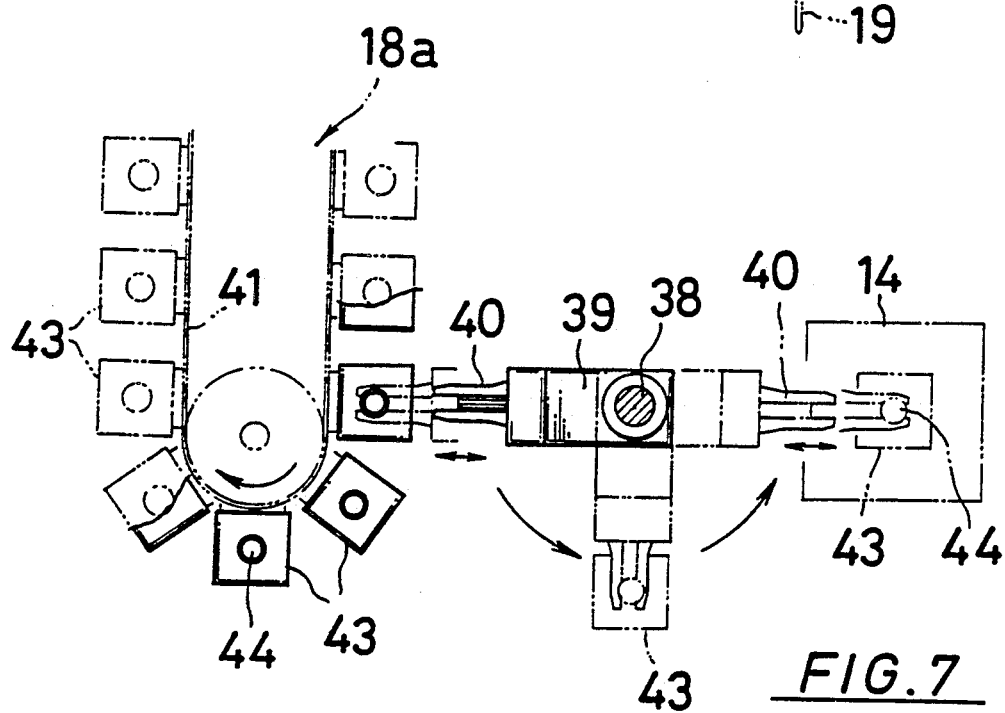
FIG. 7 is a plan view of the same.

In the removal operation of the transport device 37, as shown in FIGS. 6 and 7, the pawl members 40 are first moved forward, and the pawl members 40 are received in both side grooves 45 (see FIG. 8) of a mounting rod 44 projected from a base block 43 of a tool base, to hold a tool, for example, the drill 19.

Next, the pawl members 40 are moved back to the original position, and the piston rod 38 is extended downward. At the lower stopped position, the piston rod 38 is rotated through 180° along with the holding member 39 to locate the drill 19 immediately below the chuck 14. The pawl members 40 are again moved forward to effect locating, after which the piston rod 38 is moved upward to insert the mounting rod 44 into the chuck 14 till the base block 43 comes into contact therewith.

The chuck illustrated in FIGS. 8 and 9 is of the conventional construction, in which a pair of holding balls 47 are provided movably in and out of both walls of a guide tube 46 and the holding balls 47 are moved in and out between flanges of the mounting rod 44 as shown due to a difference between air pressure supplied into the interior and spring pressure to effect engagement and disengagement. Upon completion of mounting, the pawl members 40 are returned to the original state, the piston rod 38 is operated reversely of the aforementioned transporting step, and the holding member 39 is returned to its original state.

After the holding member 37 has been removed from the underside of the chuck, the processing unit 9 is moved down together with the spindle 10, and by rotation of the spindle 10, the drill 19 bores a hole as required of the work 4. Upon completion of the processing work and when the processing unit 9 is moved to its original position and stops, the transport device 37 is operated to remove the drill, and the drill 19 is returned to the rotary magazine 18a by the operation reversely of the transporting step.

In an example shown in FIG. 10, a power source for the discharge processing is utilized to effect grinding and polishing by the electrolytic inprocess dressing grinding process, in which after the processing liquid within the tank has been discharged, a conductive nozzle 50 is set directed at a portion to be ground of the work 4, and pole (−) of the processing electrode is connected to the nozzle 50. In place of a discharge electrode, a magnet 50 (a straight type cast fiber bond CBN grinding wheel, a cup type cast fiber bond CBN grinding wheel, etc.) is mounted on the chuck which is pole (+), and the magnet 51 is moved closer to a shoulder at the fore end of the nozzle 50 in spaced relation of about 1 to 2 mm and rotates while issuing a coolant from the nozzle 50. Thereby, adequate abrasive grain projection effect is obtained by the electrolytic action produced thereat, and the removal effect of ground chips is easily attained.

INDUSTRIAL APPLICABILITY

As described above, the processing machine of this invention has many processing functions, and therefore has advantages that in fabrication of mold, plural units of machines with different processing functions need not be equipped, whereby less space for the machine to be installed in the factory will suffice, and equipment cost is reduced; and the operation of the machine is not particularly complicated and continuous difference processings can be effected within moving the work, as a consequence of which the mold with high processing accuracy can be fabricated. Thus, the effect of the present invention is great and the machine of this invention is very useful in industry and can be widely utilized.

What is claimed is:

1. A composite processing machine comprising a work table having on the upper surface thereof a liquid tank for accommodating and securing a work, means for moving the work table in a direction of X and Y axes, a processing unit wherein a chuck capable of detachably mounting various tools and a discharge electrode is provided on the fore end of a spindle positioned upwardly of the work table and which is provided with a motor for rotating the spindle and a fixing brake, means for moving the processing unit in a direction of z-axis, an auto tool changer (ATC) which holds a cutting tool, a discharge electrode, a measuring probe, a grinding wheel and the like to selectively feed them to the chuck, and a processing power source connected over the discharge electrode mounted on the chuck or the grinding wheel and the work within the liquid tank or a nozzle for a coolant to apply a dc current thereto.

2. A composite processing machine comprising a work table having on the upper surface thereof a liquid tank for accommodating and securing a work, means for moving the work table in a direction of X and Y axes, a processing unit wherein a chuck capable of detachably mounting various tools and a discharge electrode is provided on the fore end of a spindle positioned upwardly of the work table and which is provided with a motor for rotating the spindle and a fixing brake, means for moving the processing unit in a direction of z-axis, an auto tool changer (ATC) which holds a cutting tool, a discharge electrode, a measuring probe, a grinding wheel and the like to selectively feed them to the chuck, a nozzle for conductive coolant set directed at a portion to be ground of a work within the tank in a state wherein a processing liquid within the tank is discharged, and a magnet mounted on the chuck which forms a pole (−) and a pole (+) of a processing power source connected to said nozzle and placed in contact with the work slightly spaced apart from the fore end of the nozzle.

3. A composite processing machine according to claim 1, wherein said auto tool changer (ATC) has a transport device provided between a rotary magazine disposed sideward of the processing unit and holding said various tools and a discharge electrode, and said transport device has a downwardly directed piston rod rotated and moved up and down, and a member holding tools provided on the fore end of the rod and reciprocated between the rotary magazine and the chuck.

4. A composite processing machine according to claim 1, wherein said various tools and the discharge electrode are integrally provided with a mounting rod projected on a base block of a tool base portion and are individually removably held on a holder provided on a circulation member of the rotary magazine through the mounting rod.

5. A composite processing machine according to claim 1, wherein said various tools comprise a cutting tool, a drilling tool, an electrolytic grinding grinding-wheel, and a measuring probe.

6. A composite processing machine according to claim 1, wherein said liquid tank is movably supported on one side in the central portion of the work table and placed horizontally in the central portion of the table, and a piston side of a hydraulically or pneumatically operated rise-and-fall device with a cylinder side thereof supported on the work table is connected to the base of the bottom of the liquid tank.

7. A composite processing machine according to claim 2, wherein said grinding wheel comprises a straight type cast fiber bond CBN grinding wheel or a cup type cast fiber bond CBN grinding wheel.

8. A composite processing machine according to claim 1, wherein said processing power source comprises an independent type power source which utilizes a switching characteristic of a transistor.

9. A composite processing machine according to claim 2, wherein said auto tool changer (ATC) has a transport device provided between a rotary magazine disposed sideward of the processing unit and holding said various tools and a discharge electrode, and said transport device has a downwardly directed piston rod rotated and moved up and down, and a member holding tools provided on the fore end of the rod and reciprocated between the rotary magazine and the chuck.

10. A composite processing machine according to claim 2, wherein said various tools and the discharge electrode are integrally provided with a mounting rod projected on a base block of a tool base portion and are individually removably held on a holder provided on a circulation member of the rotary magazine through the mounting rod.

11. A composite processing machine according to claim 2, wherein said various tools comprise a cutting tool, a drilling tool, an electrolytic grinding grinding-wheel, and a measuring probe.

12. A composite processing machine according to claim 2, wherein said liquid tank is movably supported on one side in the central portion of the work table and placed horizontally in the central portion of the table, and a piston side of a hydraulically or pneumatically operated rise-and-fall device with a cylinder side thereof supported on the work table is connected to the base of the bottom of the liquid tank.

13. A composite processing machine according to claim 2, wherein said processing power source comprises an independent type power source which utilizes a switching characteristic of a transistor.

* * * * *